United States Patent Office 3,495,012
Patented Feb. 10, 1970

3,495,012
SOIL FUNGICIDES AND THEIR USE
Pasquale P. Minieri, Woodside, N.Y., and Roy T. Gottesman, Glen Rock, N.J., assignors to Tenneco Chemicals, Inc., a corporation of Delaware
No Drawing. Filed Jan. 13, 1967, Ser. No. 608,980
Int. Cl. A01n 9/24
U.S. Cl. 424—313     3 Claims

ABSTRACT OF THE DISCLOSURE

Dialkyl 2,2,2-trichloroethylidenemalonates effectively control the growth of soil fungi, and particularly plant pathogens, without causing appreciable injury to plants growing in the fungus-infested soil.

---

This invention relates to methods of controlling the growth of soil fungi. More particularly, it relates to fungicidal compositions containing dialkyl 2,2,2-trichloroethylidenemalonates and to methods in which these compositions are used to protect plants from attack by soil-dwelling fungi.

In accordance with this invention, it has been found that dialkyl 2,2,2-trichloroethylidenemalonates are highly effective in controlling the growth of a wide variety of soil-dwelling fungi, including such plant pathogens as *Pythium aphanidermatum, Sclerotium rolfsii, Rhizoctonia solani, Fusarium oxysporum*, and the like. These compounds are stable and resistant to weathering and at the concentration levels necessary to control the growth of fungi show little or no phytotoxicity and are substantially non-toxic to animals that consume the plant materials. The ability of the dialkyl 2,2,2-trichloroethylidenemalonates to control the growth of soil-dwelling fungi without causing appreciable injury to plants growing in the soil is remarkable since it has been reported that these compounds are useful as selective herbicides.

The compounds that can be used as the primary fungicidally-active components of the compositions of this invention have the structural formula

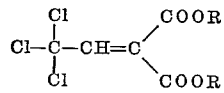

wherein each R represents an alkyl group having from 1 to 4 carbon atoms. These compounds include, for example, dimethyl 2,2,2-trichloroethylidenemalonate, diethyl 2,2,2-trichloroethylidenemalonate, dipropyl 2,2,2-trichloroethylidenemalonate, and dibutyl 2,2,2-trichloroethylidenemalonate. The preferred compound for use as a soil fungicide is dimethyl 2,2,2-trichloroethylidenemalonate.

The fungicidal esters may be prepared by any suitable and convenient procedure. For example, they may be prepared by the reaction of the appropriate dialkyl malonate with chloral.

While the dialkyl 2,2,2-trichloroethylidenemalonates may be applied as such to the soil, they are ordinarily and preferably combined with an inert fungicidal adjuvant carrier and applied as solutions, emulsions, suspensions, or dusts in which the active material comprises a minor proportion of the total composition. Aqueous emulsions or suspensions that contain about 0.001 percent to 1 percent, and preferably 0.01 percent to 0.5 percent by weight of the active agent are particularly suitable for this use.

These compositions may also contain about 0.01 percent to 0.1 percent by weight of a wetting agent, such as an alkyl sulfate, an alkyl aryl sulfonate, a sulfosuccinate, a polyethylene glycol ether, and the like. Alternatively, the fungicidal compounds may be dissolved in an organic solvent, such as acetone, naphtha, ethylene chloride, or kerosene, and applied as solutions, or they may be mixed with or deposited upon such inert finely-divided solid carriers as chalk, bentonite, talc, kaolin, fuller's earth, and the like and applied as dusts.

The fungicidal compositions may be applied to the soil by known procedures. They may be applied to the surface of the soil and then mixed into the soil to the desired depth, or they may be applied by spot injection or conventional drilling techniques wherein a measured amount of the fungicidal composition is introduced into the soil at spaced intervals and at predetermined depths. The fungicidal compositions may also be applied by introducing it into water used to irrigate the soil. Excellent results have also been obtained when the compositions were applied to seeds before the seeds were planted.

The amount of the composition that is applied either to seeds or to the soil is that which will satisfactorily control the growth of soil fungi while causing little or no injury to plants growing in the soil. About 1 pound to 200 pounds of the active compound is ordinarily applied per acre of soil with particularly good results being obtained when 5 pounds to 35 pounds per acre is used. Larger or smaller amounts of the fungicide may be applied as desired, depending upon the nature of the soil, the types of fungi involved, and the types of plants that are growing in the soil.

The invention is further illustrated by the examples that follow.

Example 1

To a mixture of 66 grams (0.5 mole) of dimethyl malonate and 73.8 grams (0.5 mole) of chloral was added 1.15 grams of diethylamine at such a rate that the temperature of the reaction mixture did not rise above 40° C. At the end of the addition, the reaction mixture had solidified. The mixture was allowed to stand 45 minutes and was then crystallized from ligroin. There was obtained an 85.8 percent yield of dimethyl 2,2,2-trichloro-1-hydroxyethylmalonate, which melted at 88°–89° C. (literature, 87.5°–89° C.) and contained 37.9 percent of chlorine (calculated, 38.1 percent of chlorine).

To 366 ml. of concentrated sulfuric acid was added 84.3 grams of dimethyl 2,2,2-trichloro-1-hydroxyethylmalonate over a period of 20 minutes. The reaction mixture was allowed to stand at room temperature for 18 hours and was then poured onto 2000 grams of ice. The solid product was collected, washed with water, and dried under vacuum at 60° C. After recrystallization from ligroin, there was obtained a 72 percent yield of dimethyl 2,2,2-trichloroethylidenemalonate, which melted at 63.5°–65° C. (literature, 62.5°–64° C.).

Example 2

Separate lots of sterile soil that had been inoculated with a plant pathogen were planted with seeds of a crop plant. The planted soil was then treated with a dilute aqueous suspension of dimethyl 2,2,2-trichloroethylidenemalonate or with a material that is used commercially to control the growth of the plant pathogen. About two weeks after treatment, the degree of control of the growth of the pathogen was determined by comparing the amount of damping off and the reduction in stand with those of untreated plants. The results of these tests are given in Table I.

that about 75 percent of the surface was covered with colonies of the organism; "3" indicates that about 50

TABLE I

| Plant Pathogen | Plant | Fungicide | Rate of Application, p.p.m. | Percent Control of Pathogen | Plant Injury |
|---|---|---|---|---|---|
| Pythium aphanidermatum | Sugar Beet | Dimethyl 2,2,2-trichloroethylidenemalonate | 100 | 100 | None. |
| | | | 50 | 98 | Do. |
| | | | 25 | 80 | Do. |
| | | | 12.5 | 82 | Do. |
| | | Diethyl 2,2,2-trichloroethylidenemalonate | 100 | 70 | Slight. |
| | | Dexon (p-dimethylaminobenzene diazo sodium sulfonate) | 12 | 100 | Do. |
| Fusarium oxysporum | Bean | Dimethyl 2,2,2-trichloroethylidenemalonate | 100 | 56 | None. |
| | | | 50 | 41 | Do. |
| | | Captan (N-[(trichloromethyl)-thio]-4-cyclohexene-1,2-dicarboximo) | 100 | 25 | Moderate. |

Example 3

Separate lots of sterilized soil were inoculated with plant pathogens. The inoculated soil was placed in 4-ounce containers, and the soil in each container was drenched with 30 ml. of an aqueous suspension containing an amount of a dialkyl 2,2,2-trichloroethylidenemalonate sufficient to provide the desired dosage rate. After incubation for two days at 70° F. the amount of mycelial growth on the surface of the soil was noted. The results of the tests are given in Table II. In this table, a rating of "1" indicates growth equal to that in inoculated soil that had not been treated with a fungicide; "2" indicates percent of the surface was covered with colonies of the organism; "4" indicates that a few scattered colonies were present; and "5" indicates no growth on the surface of the soil.

TABLE II

| Fungicide | Rate of Application, lbs./acre | Effectiveness Against Plant Pathogens | | | |
|---|---|---|---|---|---|
| | | Sclerotium rolfsii | Pythium sp. | Rhizoctonia solani | Fusarium oxysporum |
| Dimethyl 2,2,2-trichloroethylidenemalonate | 150 | 5 | 5 | 5 | 5 |
| | 75 | 5 | 5 | 5 | 5 |
| | 37 | 5 | 5 | 5 | 5 |
| | 18 | 3 | 1 | 4 | 3 |
| Diethyl 2,2,2-trichloroethylidenemalonate | 150 | 5 | 4 | 5 | 5 |
| | 75 | 4 | 1 | 3 | 3 |
| | 37 | 2 | 1 | 1 | 2 |

Example 4

Using the procedure described in Example 3, dimethyl 2,2,2-trichloroethylidenemalonate was applied to soil infested with plant pathogens in which crop plants were growing. Included in the tests were plants growing in infested soil that had been treated with a commercial fungicide, plants growing in infested soil that had not been treated with a fungicide, and plants growing in sterilized soil. The results of these tests are summarized in Tables III-A and III-B.

TABLE III-A

| Plant Pathogens | Plant | Fungicide | Rate of Application, lb./acre | Diseased Plants/Healthy Plants | Observations on Growth of Plants |
|---|---|---|---|---|---|
| Fusarium oxysporum | Tomato | Dimethyl 2,2,2-trichloroethylidenemalonate | 32 | | Seedlings killed. |
| | | | 16 | 0/5 | Growth retarded. |
| | | | 8 | 0/5 | Good growth. |
| | | Captan | 8 | 0/5 | Do. |
| | | Inoculated soil | 0 | 3/2 | Very poor growth. |
| | | Sterilized soil | 0 | 0/5 | Very good growth. |
| Rhizoctonia solani | Bean | Dimethyl 2,2,2-trichloroethylidenemalonate | 64 | 0/5 | Growth retarded. |
| | | | 32 | 0/5 | Growth slightly retarded. |
| | | | 16 | 0/5 | Very good growth. |
| | | | 8 | 0/5 | Do. |
| | | Captan | 8 | 1/4 | Good growth. |
| | | Inoculated soil | 0 | 5/0 | Fair growth. |
| | | Sterilized soil | 0 | 0/5 | Very good growth. |

TABLE III-B

| Plant Pathogen | Plant | Fungicide | Rate of Application, lb./acre | Percent Emergence | Observations on Growth of Plants |
|---|---|---|---|---|---|
| Pythium sp | Peas | Dimethyl 2,2,2-trichloroethylidenemalonate | 64 | 40 | Growth retarded. |
| | | | 32 | 100 | Good growth. |
| | | | 16 | 80 | Very good growth. |
| | | | 8 | 50 | Fair growth. |
| | | Dexon | 8 | 70 | Good growth. |
| | | Inoculated soil | 0 | 0 | |
| | | Sterilized soil | 0 | 100 | Very good growth. |
| Sclerotium rolfsii | Peas | Dimethyl 2,2,2-trichloroethylidenemalonate | 32 | 60 | Good growth. |
| | | | 16 | 10 | Do. |
| | | | 8 | 70 | Do. |
| | | Captan | 8 | 90 | Do. |
| | | Inoculated soil | 0 | 20 | Poor growth. |
| | | Sterilized soil | 0 | 100 | Very good growth. |

Example 5

Peanuts were treated with a dust containing 10 percent by weight of dimethyl 2,2,2-trichloroethylidenemalonate and then planted in soil that had been infested with *Sclerotium rolfsii*. Twenty-one days later the number of growing plants was noted. For comparative purposes, peanuts treated with PCNB (pentachloronitrobenzene) and untreated peanuts were included in the tests. The results obtained are summarized in Table IV.

TABLE IV

| Fungicide | Dosage (percent/ weight of seed) | Percent stand after 21 Days |
|---|---|---|
| Dimethyl 2,2,2-trichloroethylidenemalonate | 1.0 | 90 |
|  | 0.25 | 65 |
| PCNB | 1.0 | 80 |
|  | 0.25 | 73 |
| None—Inoculated Soil | 0 | 0 |
| None—Sterilized Soil | 0 | 60 |

What is claimed is:

1. A process for the control of soil fungi which comprises contacting said fungi with a fungicidal amount of a compound having the structural formula

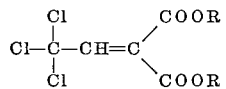

wherein each R represents an alkyl group having from 1 to 4 carbon atoms.

2. The process of claim 1 wherein the fungicidal compound is dimethyl 2,2,2-trichloroethylidene malonate.

3. The process of claim 1 wherein the fungicidal compound is diethyl 2,2,2-trichloroethylidene malonate.

References Cited

UNITED STATES PATENTS 2,617,722   11/1952   Mowry et al. _____ 260—485

OTHER REFERENCES

Beran et al.: Chem. Abstracts, vol. 46, p. 9766h (1952).

ALBERT T. MEYERS, Primary Examiner

VINCENT D. TURNER, Assistant Examiner